Figure 1:
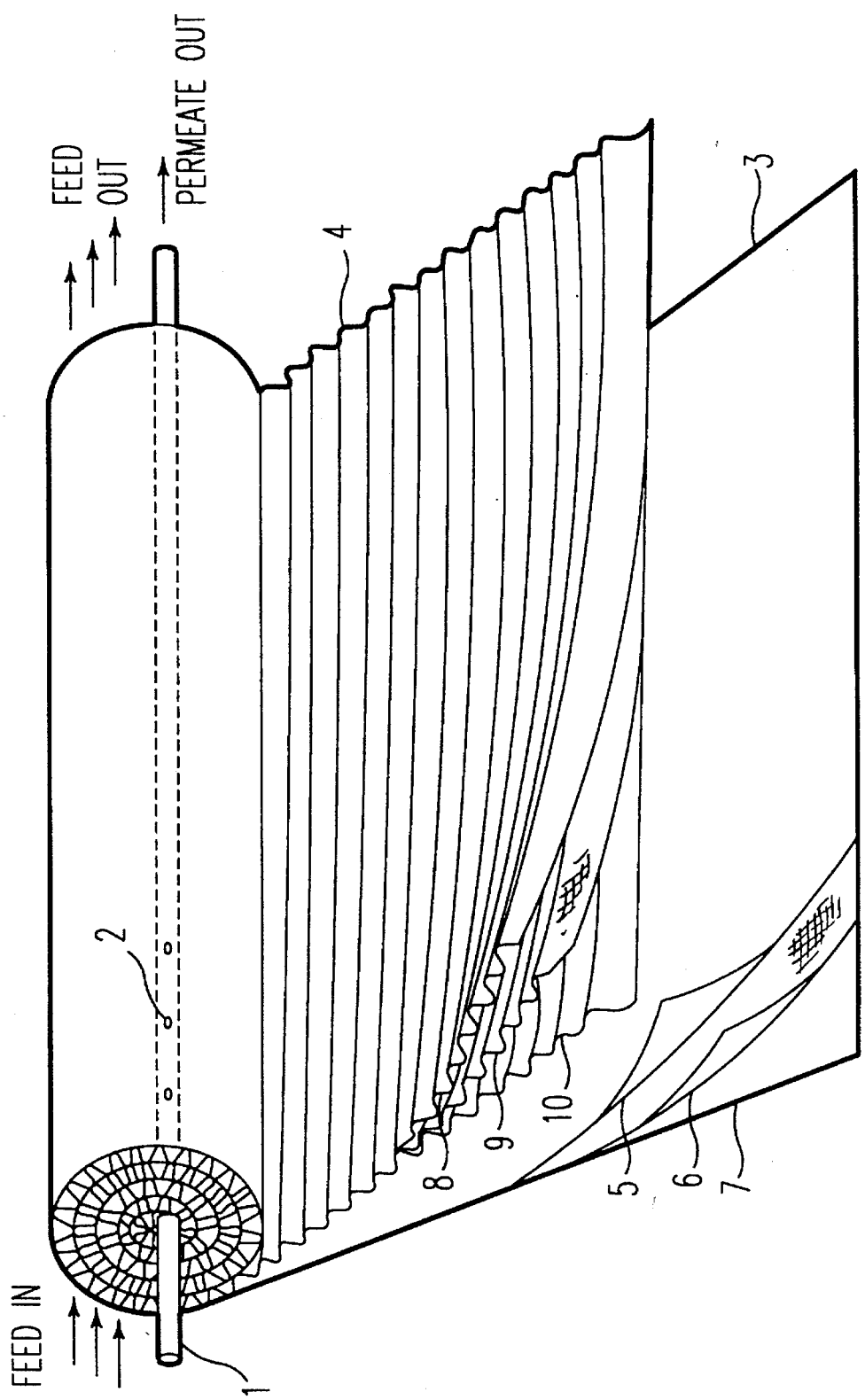

United States Patent [19]

Mannapperuma

[11] Patent Number: 5,458,774
[45] Date of Patent: Oct. 17, 1995

[54] CORRUGATED SPIRAL MEMBRANE MODULE

[76] Inventor: Jatal D. Mannapperuma, 2068 Alta Loma St., Davis, Calif. 95616

[21] Appl. No.: 279,355

[22] Filed: Jul. 25, 1994

[51] Int. Cl.⁶ .................................................. B01D 63/10
[52] U.S. Cl. ...................................... 210/321.83; 210/487
[58] Field of Search .................... 210/321.84, 321.74, 210/487, 493.4, 494.1, 321.83

[56] References Cited

U.S. PATENT DOCUMENTS 3,401,798  9/1968  Nyrop .................................. 210/487 X
3,962,096  6/1976  Ishii et al. ............................ 210/456 X

FOREIGN PATENT DOCUMENTS 4330920  11/1992  Japan .................................... 210/487

Primary Examiner—Frank Spear
Attorney, Agent, or Firm—William S. Bernheim

[57] ABSTRACT

An improved spiral membrane and module for cross flow filtration where several of the membrane envelopes are wavelike or corrugated in structure to allow unobstructed flow of the feed to reduce the feed path fouling when used to filter feed containing particulate matter.

4 Claims, 1 Drawing Sheet

CORRUGATED SPIRAL MEMBRANE MODULE

BACKGROUND OF THE INVENTION

1. Field of Use

This invention generally relates to the filtration of liquids containing suspended or dissolved solids.

2. Prior Art

Filtration of liquids containing dissolved or suspended particles involves forcing the liquid under pressure against a barrier permeable to the liquid but not to most of the solids. In dead-end filtration the filter medium gets saturated with the solids and is replaced periodically. In cross flow filtration the liquid flows under pressure along the membrane filter surface at a high velocity to prevent the membrane surface from being completely covered by separated solids. This feature allows the membrane to be used for a longer period.

Cross flow membrane filtration spectrum involves filtering of particles about 10 microns (0.010 mm) to single molecules about 10 Angstoms (0.001 microns) in size. This range is divided into four classes called microfiltration, ultrafiltration, nanofiltration and reverse osmosis in the decreasing order of particle size. As the size of the particles to be filtered decreases the pressure required to filter increases.

The major challenge in industrial membrane filtration is the design of membrane modules that can pack large membrane areas into small volumes and that can withstand high pressures required in filtration.

In U.S. Pat. No. 3,367,504 a spiral membrane module is taught which consists of a central pipe for carrying the filtered liquid called permeate, and a membrane envelope and a grid material called feed spacer. The membrane envelope comprises of two permeable membrane layers sandwiching a third layer called permeate spacer which is sufficiently strong to withstand the pressure required in filtration and sufficiently porous to allow the flow of the permeate.

The membrane envelope is sealed along three ends and the fourth end is connected to the central tube so that the permeate can enter the central tube through perforations in the central tube. The feed spacer grid is placed on the membrane envelope and the two are wrapped around the central tube in the form of a spiral.

The spirally wrapped membrane module is placed inside a cylindrical vessel which provides hydraulic separation of feed and permeate streams. The feed liquid is pumped axially along the feed spacer grid from one end of the module to the other end. The filtered liquid enters into the permeate spacer in the membrane envelope, moves along the spiral path to the central tube, enters it through the perforations, and leaves at the end of the tube.

Spiral membranes consisting of several membrane envelopes, and feed spacer grids are also constructed to shorten the permeate flow path which reduces the pressure drop in the permeate side.

The spirally wound membrane allows a large membrane area to be packed into a small volume. It can also withstand high pressures. The major disadvantage of the spiral configuration is its inability to accommodate suspended particulate matter due to fouling of the feed spacer grid. It is desirable to have a spiral membrane module that has a high packing density, can withstand high pressures, and also accommodate feed liquids containing particulate matter.

OBJECTS OF THE INVENTIONS

The object of this invention is to provide a spiral membrane module that has a high packing density, can withstand high pressures, and also accommodate feed liquids containing substantial amounts of particulate matter.

DETAIL DESCRIPTION OF THE PREFERRED EMBODIMENT

FIG. 1 shows the spiral membrane module.

In accordance with the present invention the improved spiral membrane module consists of the central tube and a pair of membrane envelopes where one of the membrane envelopes is corrugated. When the pair of envelopes is wrapped around the central tube in the form of a spiral, the corrugations form a multiplicity of channels. These channels serve as an unobstructed flow path for the feed liquid thus doing away with the feed spacer grid. The size of the corrugations are changed to accommodate the particles in the feed streams.

In accordance with the present invention and with reference to the drawing, the corrugated spiral membrane module consists of a central tube 1 with holes 2 and two membrane envelopes 3 and 4 of which the membrane envelope 4 is corrugated. Membranes 5 and 6 and permeate carriers 7 are bonded together liquid tight at three ends to form the uncorrugated envelope 3. Membranes 8 and 9 and permeate carrier 10 are bonded together liquid tight at three ends to form the corrugated envelope 4.

The two membrane envelopes 3 and 4 are bonded to the central tube allowing the permeate carriers 7 and 10 direct liquid contact with the holes on the central tube. The membrane envelopes 3 and 4 are then wrapped around the central tube to form a spiral which causes the open corrugated flutes on membrane envelope 4 to form a multiplicity of channels.

The corrugated spiral membrane module is placed inside a cylindrical vessel which provides hydraulic separation of feed and permeate flows. The feed liquid containing the solid matter is pumped under pressure from one end under pressure through these channels. The clean liquid that permeates the membrane moves in the permeate carrier along the spiral path and enters the central tube through the holes and discharges at the ends of the tube 1. The permeate can be collect at any one of the ends. The retentate is collected at the end opposite to the feed end.

This invention employs one of the membrane envelopes to guide the flow of feed rather than using a separate feed spacer grid. All the surface area that is in contact with the feed flow is active in filtration thus eliminating parasitic drag of feeder spacer grid present in the conventional spiral module. The corrugated spiral membrane modules can be constructed with multiple pairs of leaves as in conventional spiral modules.

The permeate carrier provides a greater portion of the structural rigidity required to maintain the wavelike shape of the corrugated membrane envelope. The corrugated envelope when laid flat is about twice as long as the uncorrugated membrane envelope which results in different permeate path lengths in the two envelopes. It is possible to use a thicker and more porous permeate carrier in the corrugated membrane envelope to compensate for the increased length of the permeate path and also to complement the structural rigidity of the corrugations.

The stiffness of the corrugations of the membrane envelopes can be further improved by providing auxiliary seams generally perpendicular to the direction of feed flow in addition to the seams at the ends. These seams can be made using the same adhesive used in the end seams. The auxiliary seams can be of any shape and pattern, only restriction being that they should allow for unobstructed flow of permeate in the spiral direction. The area occupied by auxiliary seams do not contribute to filtration of the liquid hence should be minimized.

The corrugation of the membrane envelope can be formed by controlled thermal treatment or any other methods. It will be understood that various modifications and changes will be apparent to those skilled in the art from the foregoing description. Such modifications are deemed to be within the scope of the appended claim.

Various features of the present invention are set forth in the following claims.

I claim:

1. In a cross flow membrane filtration module for separating solids from liquids including a central pipe for carrying the filtered liquid and two membrane envelopes spirally wound around the central tube, where each membrane envelope comprises two permeable membranes sandwiching a third porous backing layer, where three sides of the membrane envelope are sealed and the fourth side is connected to the central tube providing a liquid connection between the porous backing layer and the said central tube, where one of the two membrane envelopes is formed into a wave like corrugated pattern, where the corrugations form a multitude of axial channels when spirally wound which provide the flow path for the feed liquid wherein: the corrugated membrane envelope is formed by placing a flat permeate spacer between two flat membranes with parallel glue lines having been drawn therebetween, pressing such structure in a corrugated mold, and allowing such glue to cure and provide structural strength to make the corrugations permanent.

2. An apparatus according to claim 1 which employs several membrane envelope pairs each consisting of a corrugated membrane envelope and an uncorrugated membrane envelope.

3. An apparatus according to claim 1 in which the corrugated membrane envelope contains a thicker and more porous permeate carrier compared to the uncorrugated membrane envelope, to compensate for the increased length of the permeate path of the corrugated membrane envelope and also to complement the structural rigidity of the corrugations.

4. An apparatus in accordance with claim 1 wherein a spacer can be imprinted with the corrugations by thermal treatment.

* * * * *